(12) United States Patent
Craven, Jr.

(10) Patent No.: US 6,279,566 B1
(45) Date of Patent: Aug. 28, 2001

(54) SHIELD FOR GAS BURNER

(75) Inventor: Joseph Braxton Craven, Jr., Columbus, GA (US)

(73) Assignee: W. C. Bradley Company, Columbus, GA (US)

( * ) Notice: Subject to any disclaimer, the term of this patent is extended or adjusted under 35 U.S.C. 154(b) by 0 days.

(21) Appl. No.: 09/633,928

(22) Filed: Aug. 8, 2000

Related U.S. Application Data

(60) Provisional application No. 60/148,685, filed on Aug. 12, 1999.

(51) Int. Cl.[7] .................................................. A47J 37/00
(52) U.S. Cl. .................. 126/41 R; 126/39 K; 99/447
(58) Field of Search ................. 126/41 R, 9 R, 126/39 R, 51, 39 J, 39 K; 99/400, 401, 444–450; 431/350; 239/288, 288.3, 288.5, 505, 520

(56) References Cited

U.S. PATENT DOCUMENTS

| 4,561,419 | * | 12/1985 | Koziel | 126/41 R |
| 4,899,724 | * | 2/1990 | Kuechler | 126/41 R |
| 5,355,868 | * | 10/1994 | Gaen | 126/41 R |
| 5,368,009 | | 11/1994 | Jones | 126/41 R |
| 5,878,739 | | 3/1999 | Guidry | 126/25 R |

* cited by examiner

Primary Examiner—James C. Yeung
(74) Attorney, Agent, or Firm—James W. Kayden; Thomas, Kayden, Horsteyemer & Risley

(57) ABSTRACT

An apparatus and mechanism for protecting a gas burner of a barbecue grill regardless of the size or shape of the barbecue grill's cooking chamber. In a preferred embodiment, a shield incorporates a base member and a sliding member, with the sliding member being adapted to engage the base member for adjusting the length of the shield. Preferably, the base member and sliding member each have two side panels, with a centerline fold disposed between the side panels. A method for protecting a gas burner of a barbecue grill regardless of the size or shape of the barbecue grill's cooking chamber is also taught.

13 Claims, 3 Drawing Sheets

SHIELD FOR GAS BURNER

CROSS-REFERENCE TO RELATED APPLICATION

This application claims priority to U.S. provisional application entitled, "SHIELD FOR GAS BURNER," having ser. no. 60/148,685, filed 08/12/99, which is entirely incorporated herein by reference.

TECHNICAL FIELD

The present invention is generally related to barbecue grills, and, more particularly, is related to shields which are adapted for mounting over gas burners of barbecue grills for shielding the gas burner from materials falling from above the burner.

BACKGROUND OF THE INVENTION

Gas-fired barbecue grills typically incorporate one or more gas burners, which are mounted within the interior of a cooking chamber. The gas burners typically are mounted in a lower portion of the cooking chamber below a cooking surface, such as a grill or grate, and are provided with a flow of gas, such as from an LP gas tank, for providing heat for cooking food items placed upon the cooking surface.

Typical gas burners are formed of metal and are configured with an interior chamber which is adapted to receive a flow of gas from one or more gas feed lines. The interior chamber of a gas burner is adapted to distribute the flow of gas from the gas feed lines about the gas burner so that the gas may be distributed through a series of gas orifices. Typically, the gas orifices are formed about a periphery of the gas burner so as to provide a relatively large flame pattern. In some embodiments, the gas orifices are downwardly directed and typically are formed along a lower portion of the outer periphery of the gas burner. Gas burners incorporating these downwardly-directed gas orifices also typically incorporate a protruding edge or flange which is positioned above the gas orifices and which overhangs the gas orifices so that drippings exuded from food items being cooked on the cooking surface of the grill, and other materials do not fall or drain into the gas orifices.

In other embodiments, gas burners have incorporated gas orifices about an upper surface of the gas burner. This particular configuration of the gas burners typically requires the use of a cover or shield which is disposed between the gas orifices and the cooking surface for preventing drippings and other materials from falling or draining into the gas orifices, and thereby potentially clogging the gas orifices.

Barbecue grills typically are not configured with a standard size or shape of cooking chamber. Heretofore, each grill incorporating a shield for protecting the gas orifices of its gas burners has required the use of a shield which has been specifically sized and shaped for use with that particular grill. Such a lack of standardized sized and shaped cooking chambers has led to the expenditure of considerable funds in designing, producing, and maintaining inventories of numerous sizes and configurations of shields.

Therefore, there is a need for improved devices and systems which address these and other shortcomings of the prior art.

SUMMARY OF THE INVENTION

The present invention provides an apparatus and mechanism for protecting a gas burner of a barbecue grill regardless of the size or shape of the barbecue grill's cooking chamber. In a preferred embodiment, a shield incorporates a base member and a sliding member, with the sliding member being adapted to engage the base member for adjusting the length of the shield. Preferably, the base member and sliding member each has two side panels, with a centerline fold disposed between the side panels.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
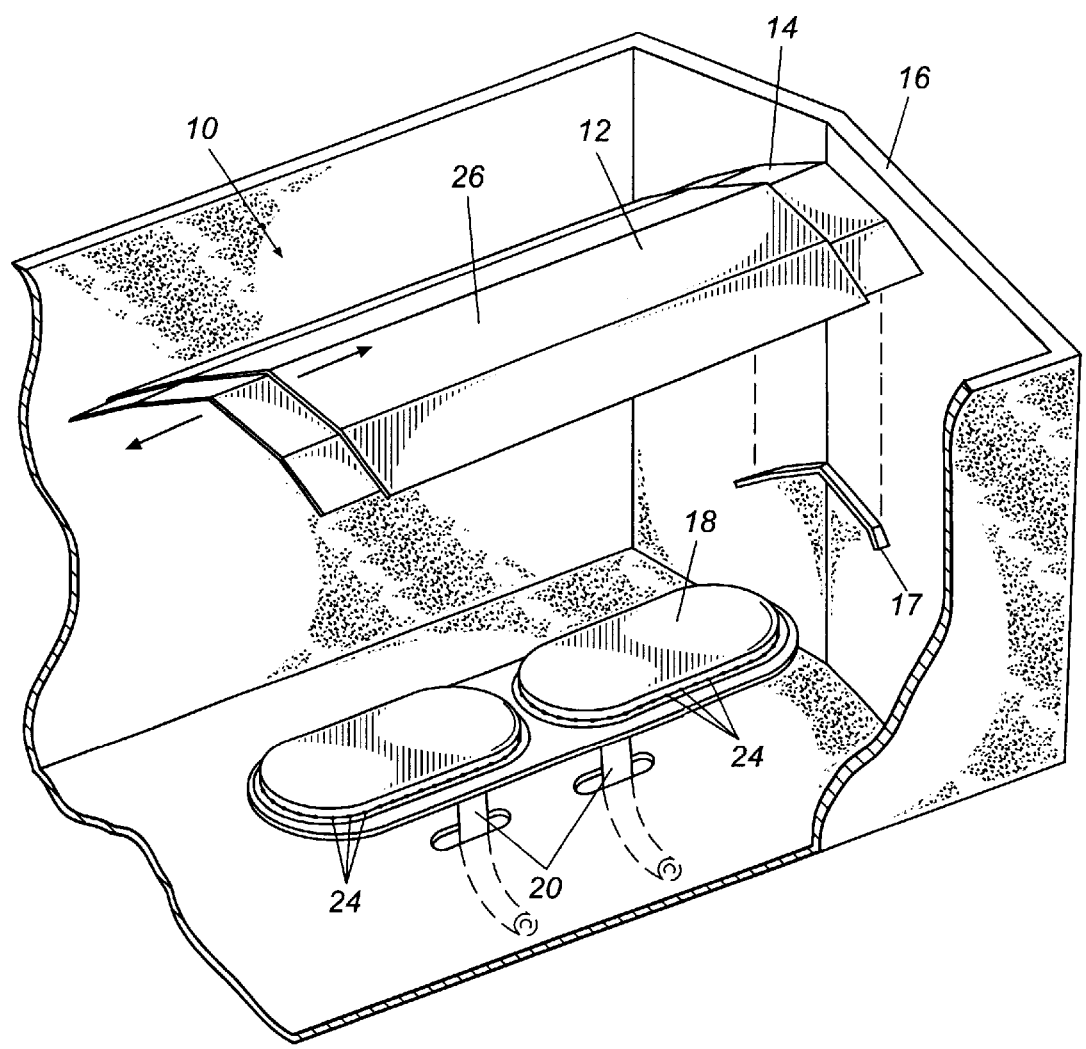
FIG. 1 is a partial, exploded, perspective view of a preferred embodiment of the present invention depicted within a representative cooking chamber of a barbecue grill.
Figure 2A:
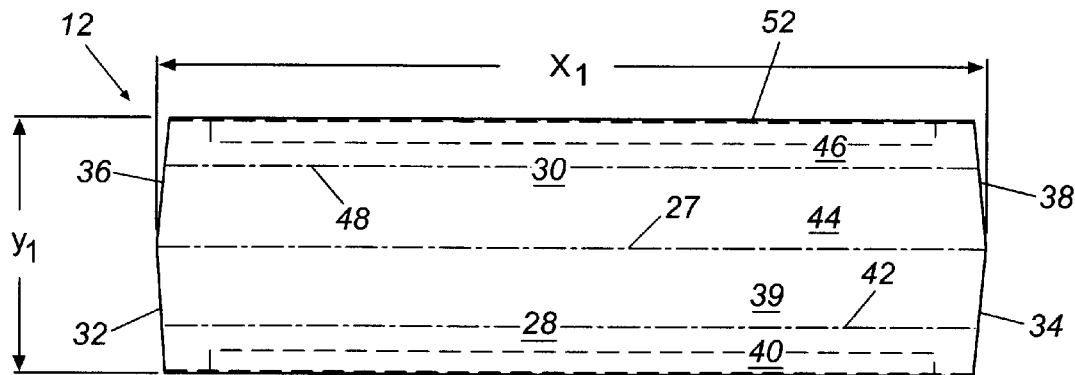
FIG. 2A is a top view of the base member of the embodiment depicted in FIG. 1.
Figure 2B:
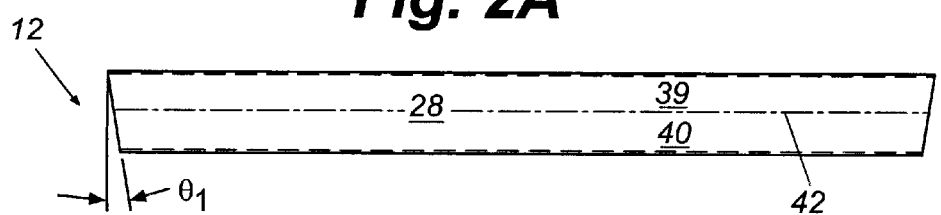
FIG. 2B is a side view of the embodiment depicted in FIG. 2A.
Figure 2C:
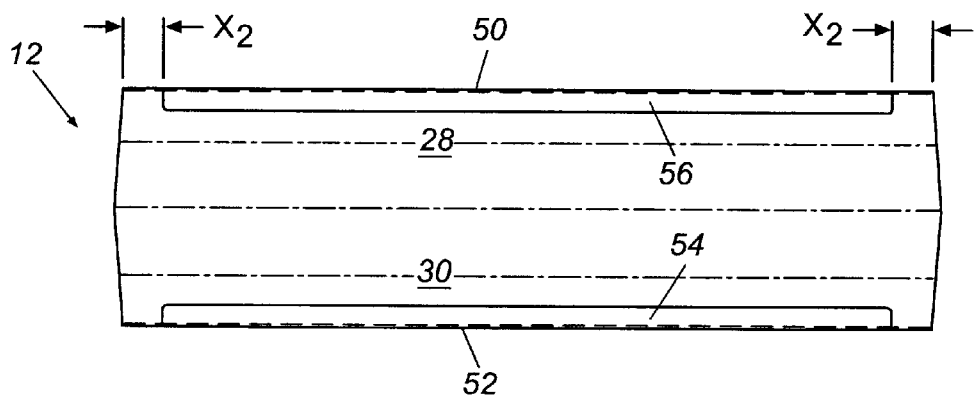
FIG. 2C is a bottom view of the embodiment depicted in FIGS. 2A and 2B.
Figure 2D:
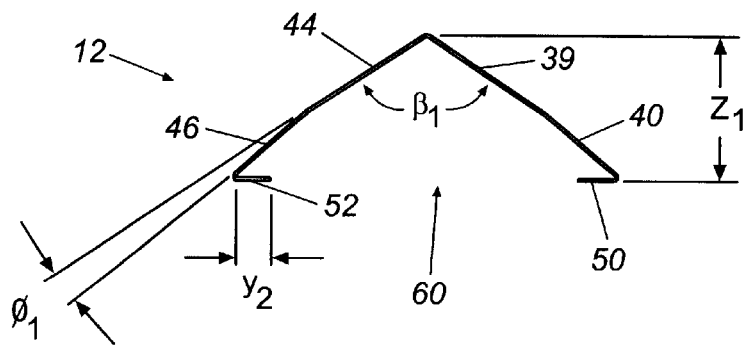
FIG. 2D is an end view of the embodiment depicted in FIGS. 2A through 2C.

Reference will now be made in detail to the drawings wherein like reference numerals indicate like parts throughout the several views. As shown in FIG. 1, a preferred embodiment of the shield 10 of the present invention incorporates a base member 12 and a sliding member 14. The shield is adapted to be mounted within a grill 16 on a support, 17 or supports above one or more gas burners 18 (representative gas burner configuration shown only for relative size comparison of the various components) which receive a flow of gas, such as from an LP gas tank (not shown). Preferably, the shield is formed of metal, such as stainless steel, among other possible materials, so that the shield is able to withstand the extreme heating and cooling cycles which occur while being oriented in such close proximity to the gas burner or burners or burner element of a barbecue grill.

Typically, gas from a source of gas is delivered through venturi tubes 20 to the gas burner and is then distributed through the interior of the gas burner. The gas is then delivered through a plurality of gas orifices 24 formed about upper surfaces of the gas burner. Once ignited by an ignition source. the gas delivered through the gas orifices provides a relatively even flame distribution for heating food items placed upon the cooking surface of the grill. The shield 10 is appropriately sized and shaped for covering the gas burner so that drippings exuded from food products during cooking, or other materials, fall upon an upper surface 26 of the shield and tend to drain across the shield and then drip downwardly to the bottom of the cooking chamber without falling or draining into one or more of the gas orifices.

As shown in FIGS. 2A through 2D, a preferred embodiment of the present invention incorporates a base member 12 which, when viewed from above, incorporates a generally rectangular shape having a length $X_1$ of approximately 14 inches and a width $Y_1$ of approximately 4 ½ inches. Additionally, the base member has a height $Z_1$ of approximately 1.7 inches. Preferably, the base member is formed with a centerline fold 27 along its length that divides the base member into two side panels (28 and 30), with an included angle $\beta_1$ of approximately 112 degrees formed therebetween, although various other angles may be utilized. Ends 32 and 34 of side panel 28, and ends 36 and 38 of side panel 30 preferably are angled downwardly and inwardly from the centerline fold, at an inward angle $\Theta_1$ of approximately 9 degrees. Additionally, side panel 28 preferably incorporates upper and lower portions 39 and 40, respectively, with a secondary fold 42 formed therebetween, and side panel 30 preferably incorporates upper and lower portions 44 and 46, respectively, with a secondary fold 48 formed therebetween. In the embodiment depicted in FIGS. 2A–2D, the lower portions of the side panels are downwardly inclined at an angle $\phi_1$ of approximately 6 degrees, relative to the upper portions.

At the lower edge (50 and 52) of each of the side panels, flanges 54 and 56, respectively, are provided which preferably extend along at least a portion of the length of the base member. In the embodiment depicted in FIGS. 2A through 2D, however, the flanges extend along the length from a center portion of the base member toward each of its ends, with each flange terminating at a distance $X_2$ of approximately ¾ of an inch from each end. Since the flanges also extend inwardly toward each other, the flanges cooperate with each other and with the inner surfaces of the side panels to form a channel 60 through which the sliding member 14 may be retained. Preferably, each flange extends inwardly a distance $y_2$ of approximately 4/10 of an inch.

Figure 3A:
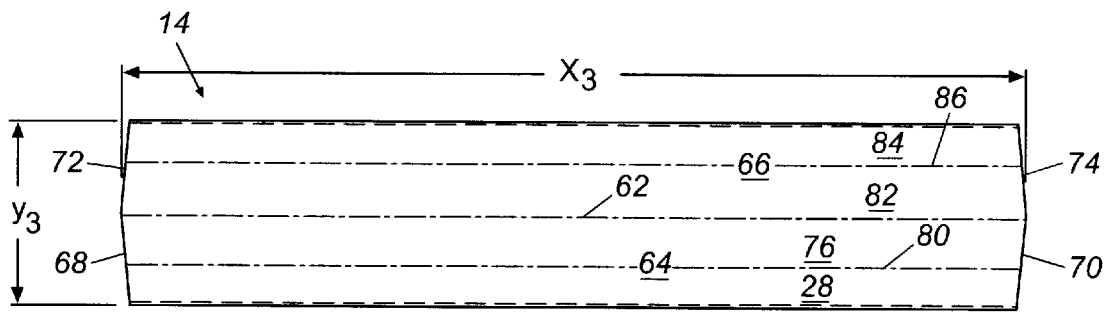
FIG. 3A is a top view of the sliding member of the embodiment depicted in FIG. 1.
Figure 3B:
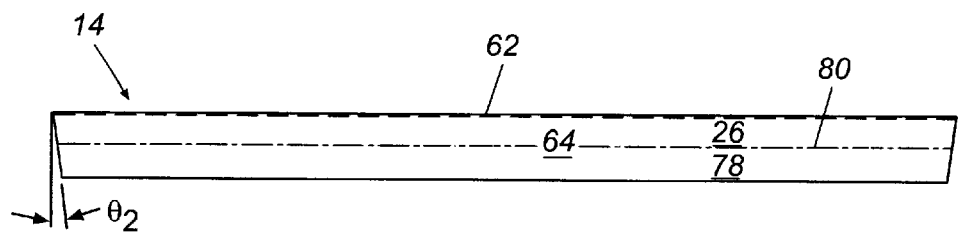
FIG. 3B is a side view of the embodiment depicted in FIG. 3A.
Figure 3C:
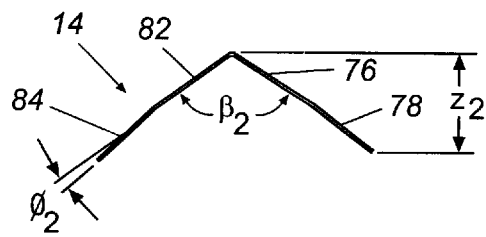
FIG. 3C is an end view of the embodiment depicted in FIGS. 3A and 3B.

As shown in FIGS. 3A through 3C, sliding member 14, when viewed from its top, also incorporates a generally rectangular configuration with a length $X_3$ of approximately 19 ¼ inches and a width $Y_3$ of approximately 4 inches. Additionally, the sliding member is formed to a height $Z_2$ of approximately 1 ½ inches. The sliding member also incorporates a centerline fold 62 with an angle $\beta_2$ of approximately 112 degrees being formed between its side panels 64 and 66. Ends 68 and 70 of side panel 64, and ends 72 and 74 of side panel 66 also preferably are angled downwardly and inwardly from the centerline fold 62, at an inward angle $\beta_2$ of approximately 9 degrees. Additionally, side panel 64 preferably incorporates upper and lower portions 76 and 78, respectively, with a secondary fold 80 formed therebetween. Side panel 66 preferably incorporates upper and lower portions 82 and 84, respectively, with a secondary fold 86 formed therebetween, with the lower portions being downwardly inclined at an angle $\phi_2$ of approximately 6 degrees relative to their respective upper portions. So configured, the sliding member may be telescopically received within the channel 60 of the base member so that the sliding member may be adjusted to fit within the lower portions of cooking chambers of various sizes and shapes and, thus, may be utilized for protecting any incorporated gas burner, burners or burner element from being clogged by drippings or other material falling from the cooking surfaces of the grills.

The dimensions discussed herein represent a preferred embodiment of the grill shield. The dimensions referenced are scalable up or down as appropriate.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations are intended to be included herein within the scope of this disclosure and the present invention and protected by the following claims.

I claim:

1. A shield for use in a barbecue grill, the barbecue grill having a cooking chamber with a gas burner disposed therein, the shield comprising:
   a base member having first and second side panels and a centerline fold disposed therebetween; and
   a sliding member having a centerline fold disposed between first and second side panels, the sliding member being adapted to engage the base member for adjusting the length of the shield.

2. The shield of claim 1, wherein each of the side panels has a secondary fold formed along a length thereof, each of the secondary folds defining upper and lower portions of its respective side panel.

3. The shield of claim 2, wherein the lower portions of the respective side panels are downwardly inclined with respect to their respective upper portions.

4. The shield of claim 2, wherein each of the lower portions of the base member has a lower edge cooperating with a flange, each of the flanges cooperating with an inner surface of the lower portion to form a channel.

5. The shield of claim 4, wherein the sliding member is adapted to engage the base member within the channel such that the sliding member is telescopically received within the channel for adjusting the length of the shield.

6. A shield for use in a barbecue grill, the barbecue grill having a cooking chamber with a gas burner disposed therein, the shield comprising:
   a base member having first and second side panels and a centerline fold disposed therebetween, each of the side panels having a secondary fold formed along a length thereof, each of the secondary folds defining upper and lower portions of its respective side panel, the lower portions of the respective side panels being downwardly inclined with respect to its upper portion, each of the lower portions having a lower edge cooperating with a flange, each of the flanges cooperating with an inner surface of the lower portion to form a channel; and
   a sliding member having a centerline fold disposed between first and second side panels, the sliding member being adapted to engage the base member within the channel such that the sliding member is telescopically received within the channel for adjusting the length of the shield.

7. The shield of claim 6, wherein the upper portions of the first and second side panels of the base member have an angle formed therebetween of approximately 112 degrees.

8. The shield of claim 6, wherein the lower portions of the base member are downwardly inclined at an angle of approximately 6 degrees.

9. The shield of claim 6, wherein the ends of the side panels of the base member are angled downwardly and inwardly from the centerline fold, at an inward angle of approximately 9 degrees.

10. The shield of claim 6, wherein the upper portions of the first and second side panels of the sliding member have an angle formed therebetween of approximately 112 degrees.

11. The shield of claim 6, wherein the lower portions of the sliding member are downwardly inclined at an angle of approximately 6 degrees.

12. The shield of claim 6, wherein the ends of the side panels for the sliding member are angled downwardly and inwardly from the centerline fold, at an inward angle of approximately 9 degrees.

13. A shield including a base member and a sliding member, for protecting the burner element in a barbecue grill from drippings or other materials falling from the grilling surface, regardless of the size and shape of the grilling chamber and the burner element, comprising:

means for covering the burner element, said means for covering being disposed between the burner element and the grilling surface;

means for supporting said means for covering disposed within said grilling chamber;

means for directing the drippings or other material falling from the grilling surface away from the burner element to the bottom of the grill; and means for telescopically adjusting the length of the shield to correspond to the length of the burner element.

* * * * *